Figures 1, 2:
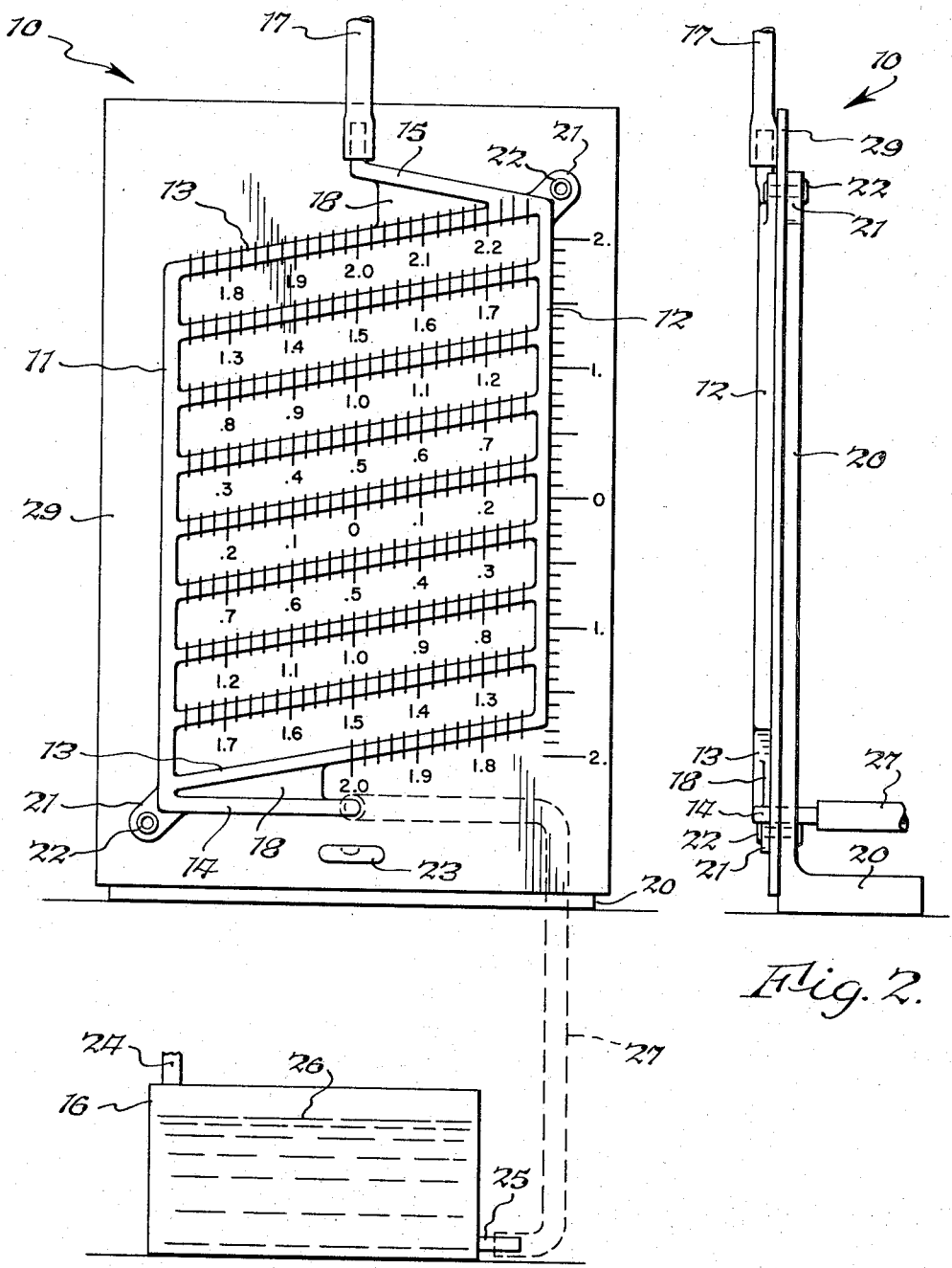

April 9, 1968 N. C. KOESTER 3,376,732
MANOMETER
Filed July 13, 1966

INVENTOR.
Norman C. Koester
BY
Christel & Bean
ATTORNEYS.

United States Patent Office 3,376,732
Patented Apr. 9, 1968

3,376,732
MANOMETER
Norman C. Koester, Lancaster, N.Y., assignor to Scott Industries, Inc., a corporation of New York
Filed July 13, 1966, Ser. No. 564,982
7 Claims. (Cl. 73—401)

The present invention relates to the manometer art, and in particular to a new and useful manometer construction arranged to provide accurate, sensitive and easily readable pressure measurements over a limited range of pressures.

Conventional manometers usually comprise a vertical tube containing a fluid movable in response to external or applied pressure. Pressure measuring indicia are disposed along the tube and, when correlated with the fluid level in the tube before and after application of the external pressure to the fluid, provide direct pressure measurement of so many units of pressure change per increment of movement. Small pressure changes are difficult to measure due to extremely fine and almost imperceptible displacement of the fluid along the vertical tube, the meniscus effect which curves the indicating surface of the fluid when using certain measuring fluids and the inability to accurately correlate such surface with the measuring indicia.

It is known, that by measuring the displacement of a fluid in an elongated inclined tube greater sensitivity and resolution of measurement can be obtained. However, such advantages are in part nullified by the unwieldliness of such apparatus since a tube of considerable length must be utilized. For example, a pressure measurement over a limited range of pressure differential on the order of plus or minus one inch of water would require a tube two feet in length and inclined fifteen degrees to the horizontal. Greater accuracy and sensitivity over this limited range would require an even longer tube at a smaller angle of inclination.

It has been proposed to provide continuously, upwardly spiralling manometer tubes. However, the spiral form complicates the apparatus, and the apparatus must be viewed from all sides for continuous reading.

Accordingly, a primary object of this invention is to provide a compact, easily readable manometer having a high degree of sensitivity to pressure changes and capable of accurate, direct reading measurement over limited pressure ranges.

It is also an object of the present invention to provide a manometer having the foregoing characteristics in which the pressure indication is readily observed from a predetermined position adjacent a face of the manometer for all pressure measurements within the range of the manometer.

It is another object of the present invention to provide a readily portable manometer having the foregoing characteristics which is substantially planar in form, low in cost and easily constructed.

The foregoing and various other novel features of construction and advantages inherent in the manometer of this invention are pointed out in detail in the following description and accompanying drawing of a typical embodiment thereof. It will be understood that such embodiment is by way of example only and to illustrate the principles of the present invention, the scope of which is limited only as defined in the appended claims.

In the drawing:

FIG. 1 is a front elevational view of a manometer constructed in accordance with the present invention, shown with its associated reservoir; and FIG. 2 is a side elevational view of the manometer of FIG. 1.

The drawing shows a manometer of the present invention, generally designated 10 and comprising a pair of vertically disposed, laterally spaced tubes 11 and 12 communicating with a plurality of parallel, vertically spaced, inclined tubes 13 connected at their ends to the vertical tubes 11 and 12. Tubes 11, 12 and 13 lie in a common plane, and comprise a communicating grid or network of tubes. The lower end of tube 11 and the upper end of tube 12 have respective lateral extensions 14 and 15 which communicate with a fluid reservoir 16 and an overflow discharge conduit 17, respectively. Tubes 11–13 are transparent and can be formed from glass or plastic in any conventional manner. In the preferred form, reinforcing webs 18 interconnect and extend between lateral extensions 14, 15 and the respective upper and lowermost inclined tubes 13.

The tube grid 11–15 is mounted on a support comprising a generally L-shaped stand 20 having a base and an upright panel. A pair of ears 21 are provided adjacent the lower and upper ends, respectively, of tubes 11 and 12 and are adapted to receive rivets 22 or other fasteners for securing the tube grid to the face panel of stand 20. Ears 21, like webs 18, can be formed as an integral part of the tube grid. Stand 20 has a bubble level 23 on its front face to aid in placing the manometer on a level surface for taking pressure measurements.

Reservoir 16 may be of any closed tank or container construction of conventional design, having a pressure input 24 through its top side and an outlet 25 through a lower portion thereof below the level of fluid 26. Any ordinary fluid suitable for the manometer art can be utilized, such as water, mineral oil, carbon tetra bromide and mercury, depending upon the desired sensitivity and other requirements. A conduit, schematically illustrated at 27, connects port 25 to lateral extension 14, the latter having a right angle bend and passing through stand 20 for connection with hose 27 behind the tube grid and stand. Pressure port 24 communicates through a conduit, not shown, with the pressure sought to be measured, also not shown, in a manner well understood in the art. Overflow 17 normally will open to atmospheric pressure, and can have a return to reservoir 16.

As noted previously, the present manometer is constructed to provide a high degree of sensitivity and accuracy over a limited range of pressures. To this end, tubes 13 are inclined slightly upwardly, at an angle of about 12° in the illustrated embodiment, in parallel relation between vertical tubes 11, 12, whereby small differences in pressure will cause relatively large and clearly visible displacement of fluid 26 along inclined tubes 13. In other words minimal vertical displacement of fluid level as a result of a small pressure difference is translated by inclined tubes 13 into a large and clearly discernible horizontal displacement. Tubes 13 communicate with tube 11 at their lower ends, and with tube 12 at their upper ends. The upper communicating end of each inclined tube 13 is positioned along tube 12 at a horizontal level no lower than the lower communicating end of the inclined tube 13 next above so that, as liquid 26 fills one inclined tube 13, it also enters the lower end of the inclined tube 13 immediately above, thereby providing continuous pressure readings along inclined tubes 13. In the illustrated form, the upper end of each inclined tube 13 lies within the vertical confines defined by the opposite ends of the inclined tube 13 next above, the upper end of each lower tube 13 being centered, horizontally, on the same level as the lower end of the tube 13 immediately above. With this arrangement, liquid 26 will enter the lower end of the inclined tube 13 next above before it completely fills the inclined tube 13 immediately below, thus providing an overlapping pressure indication for fluid levels near the upper ends of inclined tubes 13. This reduces the meniscus problem, and facilitates reading from one position.

As a result of this construction, fluid 20 communicates into vertical tube 11 from reservoir 16 via hose 27 and lateral extension 14 and flows upwardly in vertical tube 11 and simultaneously along the lowermost inclined tube 13 to tube 12. The fluid levels in vertical tubes 11, 12 and in inclined tubes 13 will always be the same as it rises and falls therein, although the fluid level in the inclined tubes 13 will be displaced a greater distance therealong for the same vertical displacement thereof in tubes 11 and 12, thereby providing a more accurate and sensitive reading along tubes 13 than along tubes 11 and 12.

Pressure measuring indicia is provided on a card or plate member 29 which is secured between the transparent tube grid and the face panel of stand 20 by rivets 22. Where fasteners 22 are removable, indicia member 24 can be replaced by another. Alternately, the indicia would be permanently provided on the face of the stand. Indicia bearing member 29 includes both vertical and inclined scalar graduations imprinted on a face thereof and extending in corresponding vertical and inclined relation behind the respective vertical and inclined tubes 11–13. The vertical graduations accordingly provide a relatively coarse measurement along tubes 11 and 12 while the inclined graduations provide a much finer measurement along the inclined tubes 13. For example, the vertical scales are subdivided into tenths of an inch, while the inclined scales are subdivided into two-hundredths of an inch. The vertical scale, in the preferred form, is transposed onto the inclined scale for direct pressure readings and a fluid level in the inclined tube may then be correlated with the inclined indicia along card or plate member 29 by looking through or on either side of the transparent tube and alining the fluid level with a particular graduation. Openings are provided in indicia plate 29 for viewing level 23 and for passage of extension 14.

In use, the manometer is placed on a level surface, with reservoir port 24 and discharge outlet 17 open to the atmosphere. If reservoir 16 is on the same surface, the fluid level in the manometer will be the same as the fluid level in the reservoir and a pressure reading can be taken. Port 24 is then placed in communication with the pressure to be measured and the fluid level in tubes 11–13 will rise or fall, depending upon whether the test pressure is above or below atmospheric pressure. A new pressure reading is taken and the difference between the two readings when added to atmospheric pressure gives a very precise measure of the test pressure. Of course, the pressure above the fluid level in the manometer may be varied by applying another known pressure or a vacuum source through outlet 17 in a conventional manner to thereby adapt the present manometer for accurate and sensitive pressure measurements within a limited range at higher or lower pressures as the case may be. The accuracy of the manometer of the present invention is directly related to the angle of the inclined tubes, the smaller the angle to the horizontal the greater the accuracy and the greater number of inclined tubes required for the same limited range of measurement between identically spaced vertical tubes. Thus the tubes may be angled to the horizontal to a greater or lesser extent and the measuring indicia likewise adjusted depending on the accuracy desired.

Accordingly, it is seen that the objects of my invention have been carried out by the foregoing construction and that extremely accurate pressure measurements may be taken over small and limited ranges of pressure differentials. The foregoing manometer construction is also very sensitive over such ranges and the measuring indicia is correlated with the tubular structure as to reflect such accuracy and sensitivity. Moreover, the entire construction provides a flat, compact, simply operated and readily portable direct reading measuring unit useful for a variety of applications and easily readable from one position in front of the instrument.

Having fully disclosed and completely described my invention, and its mode of operation, what I claim as new is:

1. A compact, easily readable manometer adapted to obtain a high degree of accuracy and sensitivity over a limited range of pressures comprising support means, a pair of generally vertical tubes carried by said support means in horizontally spaced apart relation, a plurality of parallel inclined tubes carried by said support means in vertically spaced apart relation, said vertical tubes communicating with said inclined tubes adjacent the opposite ends thereof, and calibrating indicia associated with said inclined tubes, the upper end of each of said inclined tubes communicating with its associated vertical tube substantially at a level no lower than that of the lower end of the inclined tube immediately above where it communicates with the other vertical tube.

2. A manometer according to claim 1 wherein said upper end of each of said inclined tubes lies within the vertical confines defined by the ends of the inclined tube next above.

3. A manometer according to claim 1 wherein said inclined tubes lie in a plane defined by said vertical tubes.

4. A manometer according to claim 3 wherein said indica means comprises a flat member disposed behind said tubes and having graduations thereon corresponding to said vertical and inclined tubes.

5. A manometer according to claim 1 together with a reservoir containing a pressure responsive fluid, means for placing said fluid in communication with the pressure to be measured, conduit means connecting said reservoir to the lower end of one of said vertical tubes, and discharge means disposed at the upper end of the other of said vertical tubes.

6. A manometer according to claim 5 wherein said upper end of each of said inclined tubes lies within the vertical confines defined by the ends of the inclined tube next above, said inclined tubes lying in a vertical plane formed by said vertical tubes, said support means comprising a stand having a vertically extending portion carrying a level, and wherein said indicia means include a flat member secured between vertically exending portion of said stand and said tubes and having graduations on the outer face thereof corresponding to said vertical and inclined tubes.

7. A manometer according to claim 1, wherein said upper ends of said inclined tubes are centered on the same horizontal level as said lower ends of the inclined tubes immediately above.

References Cited

UNITED STATES PATENTS 1,775,227   9/1930   Riggs _____ 73—401 RX

LOUIS R. PRINCE, *Primary Examiner.*

DONALD O. WOODIEL, *Assistant Examiner.*